No. 735,327. PATENTED AUG. 4, 1903.
J. H. WHITTINGTON.
BACK PEDALING BRAKE.
APPLICATION FILED OCT. 11, 1901.
NO MODEL.
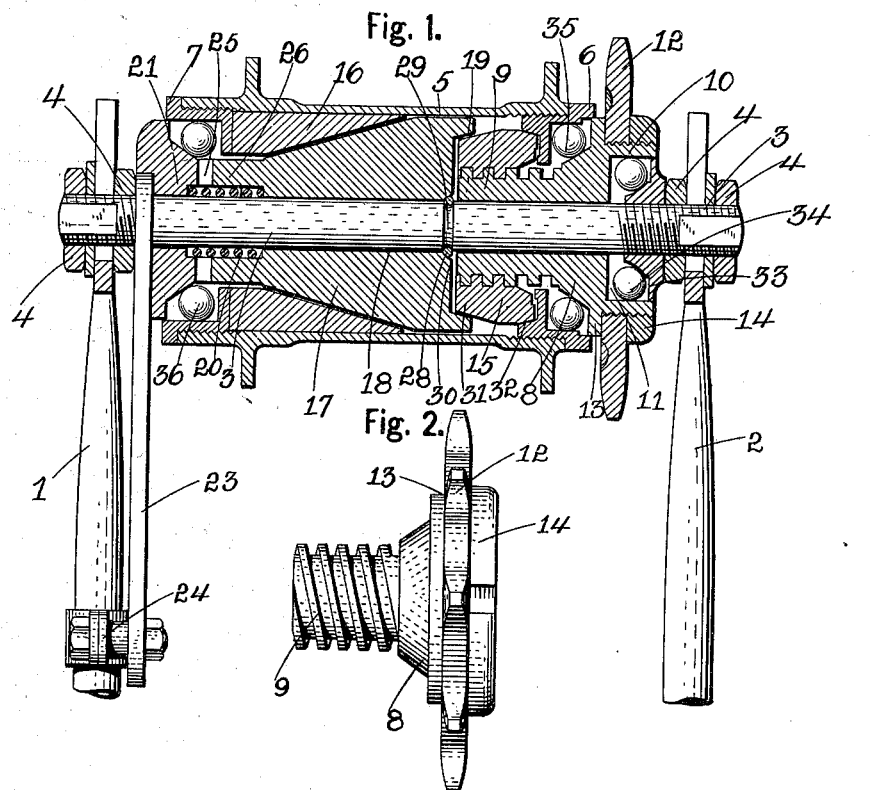
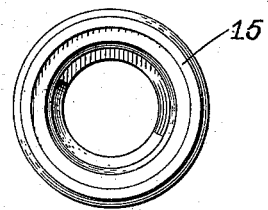
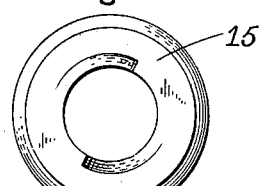
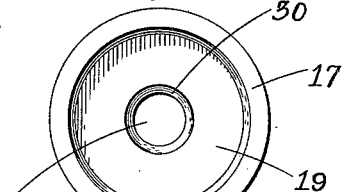
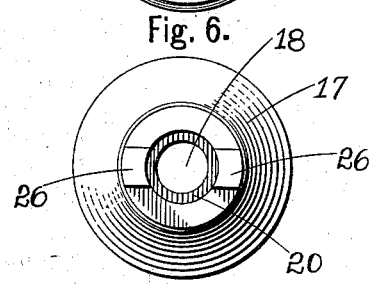
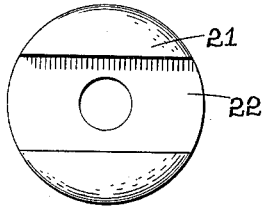
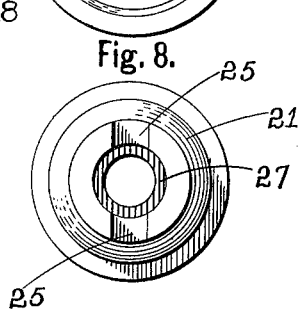
Witnesses.
L. M. Sangster.
Geo. A. Neubauer.
Inventor.
Joseph H. Whittington,
By A. J. Sangster
Attorney.

No. 735,327. Patented August 4, 1903.

UNITED STATES PATENT OFFICE.

JOSEPH H. WHITTINGTON, OF BUFFALO, NEW YORK, ASSIGNOR TO FORSYTH MANUFACTURING COMPANY, OF BUFFALO, NEW YORK.

BACK-PEDALING BRAKE.

SPECIFICATION forming part of Letters Patent No. 735,327, dated August 4, 1903.

Application filed October 11, 1901. Serial No. 78,347. (No model.)

*To all whom it may concern:*

Be it known that I, JOSEPH H. WHITTINGTON, a citizen of the United States, residing at Buffalo, in the county of Erie and State of New York, have invented certain new and useful Improvements in Back-Pedaling Brakes, of which the following is a specification.

This invention relates to an improved coaster-brake for bicycles and the like of that type which is attached to the rear hub; and the main object of the invention is to reduce the friction to a minimum. This is accomplished by means of a sleeve which is rotatably and loosely threaded on the sprocket-support and is moved longitudinally on said sprocket-support to set or release the brake.

The invention also relates to certain details of construction, all of which will be fully and clearly hereinafter described and claimed, reference being had to the accompanying drawings, in which—

Figure 1 represents a fragment of a bicycle with a central longitudinal section through a hub equipped with the improved brake mechanism. Fig. 2 is a detached side elevation of the sprocket-supporting cone and sprocket. Fig. 3 is a detached view of the tubular screw-threaded sleeve looking toward its outer face. Fig. 4 is a detached view of the tubular screw-threaded sleeve looking toward its inner face. Fig. 5 is a detached face view of the tapering wedge looking toward its inner face. Fig. 6 is a detached view of the tapering wedge looking toward its outer face. Fig. 7 is a detached exterior face view of the fixed cone. Fig. 8 is a detached inner face view of the fixed cone.

In referring to the drawings for the details of construction like numerals designate like parts.

Fragments of the rear extremes of the rear forks of the bicycle or the like are shown in Fig. 1 and are designated by the numerals 1 and 2. The spindle or shaft 3 of the rear wheel is secured in place between these forks in the usual way by lock-nuts 4. The tubular hub 5 is internally screw-threaded at each end, and the bearing-cases 6 and 7 are screwed into said ends. The sprocket-supporting cone 8 has an inner tubular screw-threaded portion 9 and an exterior screw-threaded portion 10, which is provided with a circular ball-bearing recess 11. The sprocket 12 is secured upon the portion 10 against the peripheral flange 13 and is locked in place by the lock-nut 14. A tubular internally-screw-threaded sleeve 15 is adapted to screw on the portion 9 and has both of its ends peripherally tapered, as will be more clearly set forth further on. The tapered sleeve 15 is free to rotate easily on the portion 9 except when frictionally held in tapering depressions, as will appear further on.

A tubular internally-tapering brake member 16 is secured within the hub 5 with its outer extreme against the inner surface of the bearing-case 6, and a cone-shaped or correspondingly extreme-tapered brake member or wedge 17 is provided with a central opening 18, through which the spindle passes. The inner extreme of the brake member or wedge is provided with a shallow-tapered depression 19, and the opening 18 enlarges near its outer extreme to form a pocket to support a spiral spring 20.

A fixed cone 21, formed substantially as shown in Figs. 7 and 8, is provided on its exterior surface with a straight groove 22, extending transversely and vertically from side to side when the cone is in position, in which the rear extreme of an arm 23 is fitted. The arm 23 is secured at or near its forward extreme to the rear fork 1 of the bicycle-frame by a clamp 24. A depression 25 is also provided on the inner surface of the cone 21, in which a reduced portion 26, extending from the outer extreme of the brake member or wedge 17, fits sufficiently to prevent rotating movement of the wedge member at any point of its adjustment on the spindle. The outer extreme of the spring 20 is fitted in a shallow central recess 27 of the fixed cone 21. The movement of the brake member or wedge from its braking or wedging position is limited by a ring 28, which is secured in an annular groove 29 in the spindle and projects above the surface of the spindle, forming a shoulder. The inner extreme of the opening 18 is enlarged, as at 30 in Fig. 1, to receive the projecting portion of the ring when the braking members are separated or in the position shown in Fig. 1.

The brake member or wedge 17 is normally retained in an inoperative position by the tension of the spring 20 and is moved into wedging or braking position with respect to the brake member 16 by a tubular internally-screw-threaded sleeve 15, which is loosely mounted on the screw-threaded portion 9 of the sprocket-supporting cone 8 and is moved inwardly into engaging position with the wedge 17 by the back rotation of the sprocket and its support caused by back pedaling. The advantage of retaining the brake member in an inoperative position or non-braking position by a spring is that the bicycle may be trundled backward without setting the brake. The inner portion 31 of the sleeve is tapered to correspond with the tapered depression 19 in the inner extreme of the wedge 17 and is adapted to fit snugly and wedge slightly in said depression when moving the wedge into braking position, so that when the sprocket is turned to bring the sleeve out it tends to withdraw the cone-wedge from contact with the tapering member attached to the interior of the hub. The contact between the wedge-surface and the sleeve-surface also tends to prevent the sleeve rotating in unison with the sprocket-support, and thus stopping longitudinal movement thereon. The bottom of the depression is of lesser circumference than the inner extreme of the sleeve to provide for wear and also secure certainty of the wedging action. The bearing-case 6 is formed with an inner tapering seat 32, in which the outer tapered extreme of the sleeve fits when in its outer non-braking position, the wall of the seat being tapered deeper or to a smaller circumference than the outer extreme of the sleeve, so that the sleeve will wedge itself slightly in the bearing-case. The object of this is to provide a means for holding the sleeve stationary, so that it will be started toward the wedge by the slightest back movement of the sprocket, thereby making the brake very quick and sensitive. The tapered sleeve is started longitudinally on the portion 9 in either direction by a quick partial rotation of the sprocket in the proper direction, being thrown out of either of the depressions 19 or 32, in which it is wedged by frictional action, which causes it to travel spirally on the portion 9 by means of its own rotative inertia into the other depression. One of the great advantages of this construction is that the sleeve rotates very freely when traveling between the depressions and that it is not necessary to use springs or other contrivances to carry the sleeve back after it has been moved into braking position. This practically eliminates friction and makes a bicycle equipped with this coaster-brake as free-running as an ordinary wheel.

The opposed tapered surfaces of the wedge, bearing-case, and sleeve will of course wear and in time will cause the play of the sleeve between the bearing-case and the wedge-depression to become great enough to allow slipping of the sprocket. This can be taken up by moving the spindle 3 lengthwise to the right, and thereby moving the shoulder or stop 28 to the right and allowing the spring 20 to force the wedge 17 farther to the right and lessening the distance between the wedge 17 and bearing-case 6. This takes up the wear between these parts, and the brake member 16 may be moved correspondingly to the right and a washer inserted between the bearing-case 7 and the outer end of the brake member 16 to retain it in its adjusted position. This provides a means for adjusting the wearing parts so that all wear can be taken up.

The operation of the device is as follows: When it is desired to set the brake by back-pedaling, the proper pressure is applied to the pedals, which turns the sprocket in the desired direction and starts the sleeve 15 out of the seat or depression 32. The sleeve 15 by means of its own inertia rotates on the portion 9 and moves longitudinally into frictional engagement with the depression 19 in the brake member 16. Further pressure on the pedals will turn the sprocket and force the sleeve against the brake member 16 to rigidly set the brake, owing to the fact that the sleeve is now held from rotation by reason of its frictional engagement in the depression 19. When back pressure on the pedals is released and forward pedaling is resumed, the forward turning of the portion 9 draws the sleeve from the depression 19 and starts it rotating outward into the seat 32. The sleeve is always in the seat 32, except when the brake is set, and as it travels in unison with the sprocket and hub friction is reduced to a minimum.

The quick easy action of this improved brake is caused by the unrestrained easy rotative movement of the sleeve and the fact that it is supported directly and very loosely on the sprocket-support.

An outer adjusting-cone 33 is secured upon a screw-threaded portion of the spindle, and a set of balls 34 are interposed between the walls of the bearing-recess 11 and this cone 33. A set of balls 35 is interposed between the bearing-case 7 and the fixed cone 21, and a set of balls 36 between the cone 8 and the bearing-case 6.

The operation of the invention will be easily understood from the foregoing description and drawings.

I claim as my invention—

1. The combination with a hub and a spindle passing through said hub, of a rotatable brake member attached to the interior of the hub, an unrotatable brake member fixed to the spindle and adapted to be moved longitudinally thereon, a spring for maintaining said brake member in a normally inoperative position, a sprocket-support rotatably mounted on the spindle and having a screw-threaded part and a rotatable sleeve with a corresponding screw-thread loose on said screw-threaded part and rotatable independently of the hub, adapted to move the brake member longitudinally on the spindle into braking position with respect to the brake member attached to the hub.

2. In a back-pedaling brake, a hub, a spindle, a brake member fixed to the hub, a coöperating brake member unrotatably fixed and longitudinally movable on the spindle, a spring normally retaining said brake members in an inoperative position, a power-transmitting device having a screw-threaded part, and a screw-threaded sleeve loose on said screw-threaded part and rotatable independently of the hub, adapted to move the brake member on the spindle into braking position with respect to the brake member attached to the hub.

3. In a back-pedaling brake, a hub, a spindle, a brake member fixed to the hub, a coöperating brake member unrotatably fixed and longitudinally movable on the spindle, a spring normally retaining said brake members in an inoperative position, a power-transmitting device having a screw-threaded part, a screw-threaded sleeve loose on said screw-threaded part adapted to move the brake member on the spindle into braking position with respect to the brake member attached to the hub and a stop on the spindle for limiting the inward movement of the unrotatable brake member.

4. In a back-pedaling brake, a hub, a spindle, an internally-tapered brake member fixed to the hub, an externally-tapered coöperating brake member unrotatably mounted on the spindle, means for longitudinally moving the brake member on the spindle into braking position within the hub and a stop on the spindle adapted to contact with the inner extreme of the said brake member on the spindle for limiting the movement of said brake member, the wear between the brake members being taken up by varying the position of the stop through longitudinal movement of the spindle.

5. In a back-pedaling brake, a hub, a spindle having an intermediate groove, a ring in said groove forming a projecting stop or shoulder, a brake member fixed to the hub, a coöperating brake member longitudinally movable on the spindle and having a depression or recess at each end, one of said recesses being tapered, a spring in one of said recesses, a sprocket, a sprocket-support having a screw-threaded part, and a sleeve on said screw-threaded part having a tapered part adapted to fit in the tapered depression in the brake member, substantially as set forth.

6. In a back-pedaling brake, a hub, a rotatable brake member, an unrotatable longitudinally-movable brake member, a power-transmitting device having a screw-threaded portion, and a brake-setting sleeve loosely threaded and freely rotatable independently of the hub on the screw-threaded portion whereby the sleeve is adapted to move into braking position by its own rotative inertia, substantially as set forth.

7. In a back-pedaling brake, a hub, a spindle having a projecting stop or shoulder, a rotatable brake member fixed to the hub, a coöperating brake member longitudinally movable and unrotatably fixed on the spindle and limited in its movement in one direction by the projecting stop or shoulder on the spindle, a spring for separating the brake members, a sprocket-support having a screw-threaded part, and a sleeve rotatable on said screw-threaded part having a tapered part adapted to wedge in the tapered depression in the brake member, substantially as set forth.

8. In a back-pedaling brake, a hub, a bearing-case attached to said hub and having a tapered recess, a spindle having a projecting stop or shoulder, a rotatable brake member fixed to the hub, an unrotatable coöperating brake member longitudinally movable on the spindle and having a tapering recess at one end, a sprocket-support having a screw-threaded part, and a sleeve on said screw-threaded part tapered toward each end and adapted to travel on the screw-threaded part into engagement with either tapered recess, substantially as set forth.

9. In a device of the class described, a hub, a rotatable braking member having attachment to the hub, a spindle, a non-rotatable braking member longitudinally adjustable on the spindle, a driving member having a screw-threaded part and a sleeve loosely threaded on the screw-threaded part of the driving member and adapted to move freely longitudinally on the said part by its own rotative inertia and frictional means for starting said sleeve, substantially as set forth.

JOSEPH H. WHITTINGTON.

Witnesses:
L. M. SANGSTER,
GEO. A. NEUBAUER.